United States Patent [19]
Ishizuka et al.

[11] Patent Number: 5,728,024
[45] Date of Patent: Mar. 17, 1998

[54] DIFFERENTIAL APPARATUS

[75] Inventors: Makoto Ishizuka; Sakuo Kurihara; Yasuhiko Ishikawa; Masahiko Asahi, all of Tochigi-ken, Japan

[73] Assignee: Tochigi Fuji Sangyo Kabushiki Kaisha, Japan

[21] Appl. No.: 610,543

[22] Filed: Mar. 6, 1996

[30] Foreign Application Priority Data

Mar. 16, 1995 [JP] Japan ................... 7-057293
May 8, 1995 [JP] Japan ................... 7-109562

[51] Int. Cl.⁶ ........................................... F16H 01/45
[52] U.S. Cl. ...................... 475/252; 475/344; 74/434
[58] Field of Search ........................ 475/252, 248, 475/344, 346; 174/665 G, 665 GA; 74/434, 437

[56] References Cited

U.S. PATENT DOCUMENTS

| | | | |
|---|---|---|---|
| 1,389,580 | 9/1921 | Davis | 475/252 |
| 1,389,720 | 9/1921 | Ward | 74/464 |
| 1,499,763 | 7/1924 | Davis | 475/336 |
| 2,269,734 | 9/1942 | Powell | 475/252 OR |
| 2,791,919 | 5/1957 | Wildhaber | |
| 2,869,399 | 1/1959 | Miles | |
| 3,071,314 | 1/1963 | Flanagan | |

(List continued on next page.)

FOREIGN PATENT DOCUMENTS

| | | |
|---|---|---|
| 130 806 | 1/1985 | European Pat. Off. |
| 1105103 | 11/1955 | France |
| 2126823 | 10/1972 | France |
| 2553169 | 4/1985 | France |
| 369548 | 2/1923 | Germany |
| 1164187 | 2/1964 | Germany |
| 2 305 305 | 8/1974 | Germany |
| 28 48 206 | 5/1980 | Germany |
| 39 31 745 | 3/1991 | Germany |
| 40 13 196 | 10/1991 | Germany |
| 40 27 368 | 3/1992 | Germany |
| 4223374 | 7/1992 | Germany |
| 51-144637 | 11/1976 | Japan |
| 54-54765 | 4/1979 | Japan |
| 54-69257 | 5/1979 | Japan |
| 55-3058 | 1/1980 | Japan |
| 55-64550 | 5/1980 | Japan |
| 59-141254 | 9/1984 | Japan |
| 60-81275 | 6/1985 | Japan |
| 62-126645 | 8/1987 | Japan |
| 62-200071 | 9/1987 | Japan |
| 63-130961 | 6/1988 | Japan |
| 2-38733 | 2/1990 | Japan |
| 3-68634 | 7/1991 | Japan |
| 4-64747 | 2/1992 | Japan |
| 6-58379 | 3/1994 | Japan |
| 1442-772 | 1/1987 | U.S.S.R. |
| 1421-933 | 3/1987 | U.S.S.R. |
| 2010145 | 1/1991 | U.S.S.R. |
| 1256990 | 11/1970 | United Kingdom |
| WO 85/04936 | 11/1985 | WIPO |
| WO 86/02420 | 4/1986 | WIPO |

*Primary Examiner*—Khoi Q. Ta
*Assistant Examiner*—Peter T. Kwon
*Attorney, Agent, or Firm*—Graham & James LLP

[57] ABSTRACT

A differential apparatus includes a differential casing, a pair of helical side gears and a pairs of helical pinion gears. The helical pinion gears are accommodated in bores formed in the differential casing, respectively. When it is expected that a helix angle of tooth trace of the helical pinion gear would be decreased by the vehicle's driving, one of the helical pinion gears is formed in advance so that the tooth depths are gradually decreased from axial ends of the helical pinion gear toward the axial intermediate potion. Conversely, when it is expected that a helix angle of tooth trace of the pinion gear would be increased by the vehicle's driving, one of the helical pinion gears is formed in advance so that the tooth depths are gradually increased from the axial ends of the helical pinion gear toward the axial intermediate potion. With the arrangement, even if the helical pinion gears are slanted, the helical pinion gear can be in uniform contact with the bore over the whole tooth width, so that it is possible to prevent an occurrence of the eccentric abrasion and seizure.

31 Claims, 14 Drawing Sheets

U.S. PATENT DOCUMENTS

| | | | |
|---|---|---|---|
| 3,251,244 | 5/1966 | Nickell. | |
| 3,412,632 | 11/1968 | McFiggans | 475/252 X |
| 3,768,336 | 10/1973 | Wharton | 475/252 OR |
| 4,776,234 | 10/1988 | Shea | 475/150 OR |
| 4,777,838 | 10/1988 | Aarestad | 74/462 X |
| 4,781,078 | 11/1988 | Blessing et al. . | |
| 4,838,118 | 6/1989 | Binkley | 475/150 X |
| 4,954,122 | 9/1990 | Nakao et al. . | |
| 5,019,021 | 5/1991 | Janson | 475/150 OR |
| 5,021,038 | 6/1991 | Beigang | 475/150 OR |
| 5,030,181 | 7/1991 | Keller | 475/150 OR |
| 5,078,660 | 1/1992 | Williams et al. | 475/252 OR |
| 5,083,987 | 1/1992 | Korner et al. | 475/252 X |
| 5,102,378 | 4/1992 | Gobert. | |
| 5,108,353 | 4/1992 | Brewer et al. | 475/251 X |
| 5,122,101 | 6/1992 | Tseng | 475/249 |
| 5,147,252 | 9/1992 | Mace et al. | 475/252 |
| 5,156,578 | 10/1992 | Hirota. | |
| 5,169,370 | 12/1992 | Dye et al. . | |
| 5,242,336 | 9/1993 | Hori | 475/251 X |
| 5,282,775 | 2/1994 | Teraoka . | |
| 5,295,923 | 3/1994 | Takefuta | 475/160 X |
| 5,310,389 | 5/1994 | Sato | 74/462 X |
| 5,326,333 | 7/1994 | Niizawa et al. . | |
| 5,366,421 | 11/1994 | Hirota. | |
| 5,385,514 | 1/1995 | Dawe | 475/336 |
| 5,415,601 | 5/1995 | Cilano | 475/252 |
| 5,441,461 | 8/1995 | Teraoka | 475/252 |
| 5,458,547 | 10/1995 | Teraoka et al. | 475/89 |
| 5,507,703 | 4/1996 | Madsack et al. | 475/248 |
| 5,556,351 | 9/1996 | Hiraisha et al. . | |

⇩ LOAD TORQUE

⇧ ROTATIONAL TORQUE

ROTATING DIRECTION OF DIFF. CASE 5,728,024

DIFFERENTIAL APPARATUS

BACKGROUND OF THE INVENTION

1. Technical Field

The present invention relates to a differential apparatus used for a vehicle or the like.

2. Description of the Related Art

In a conventional art, a differential apparatus as shown in FIG. 1 is disclosed in Japanese Utility Model Publication (kokai) No. 6-43401. In the publication, the differential apparatus 301 includes a differential casing 303, respective pairs of long and short helical pinion gears 305, 307, and a pair of helical side gears 309, 311 on the output side of the differential apparatus 301. The respective pinion gear 305, 307 are accommodated in bores 313, 315 formed in the differential casing 303 so as to frictionally rotate therein. Driving force of an engine for rotating the differential casing 303 is transmitted from the pinion gears 305, 307 to vehicle wheels through the side gears 309, 311. During transmitting torque, respective tips of the respective pinion gears 305, 307 are forced against walls of the bores 313, 315 by reaction force in meshing the side gears 309, 311 with each other, so that frictional resistance is produced between the pinion gears 305, 307 and the bores 313, 315. In addition, due to thrust force of the meshing helical gears, frictional resistance is also produced between the side gear 309 and the side gear 311, between the respective pinion gears 305, 307 and the differential casing 303, or between the respective side gears 309, 311 and the differential casing 303. In this way, the differential limiting force of the differential apparatus 301 is obtained by these frictional resistance. To the so-constructed differential apparatus 301, there was carried out a seizure resistance test where seizure and scuffing of the frictional parts were investigated after the differential rotation corresponding to left and right turnings of the vehicle in several cycles had been applied to the differential apparatus on condition that the temperature of oil in the differential casing was decreased so that the flow of oil was influenced, while the differential revolutions and input torque were determined to respective predetermined values.

The result was that some of the short pinion gears are subjected to frictional wear at their axial intermediate portions and the others are subjected to frictional wear at their respective axial ends. The reason why such a phenomenon arises is believed as follows.

FIG. 2 shows a cross sectional view of the differential apparatus 301. In FIG. 2, the short pinion gear 307 is arranged in a manner that when the vehicle is traveling forward, the gear 307 rotates following the preceding long pinion gear 305 in a rotating direction (shown with an arrow 300) of the differential casing 303. FIG. 2 also shows a meshing area between the short pinion gear 307 and the side gear 311 and another meshing area between the short pinion gear 307 and the long pinion gear 305.

FIG. 3 shows a lateral side of the short pinion gear 307 including a tooth trace 319 thereof, viewed from a direction Y of FIG. 2. Further, FIG. 4A shows an end face of the pinion gear 307 where its end face (half) viewed along a direction A of FIG. 3 is shown on the left side of the figure while the end face (half) viewed along a direction B of FIG. 3 is shown on the right side of the figure. In FIGS. 3 and 4A, letters EA, EB designate respective axial end points of portions of the pinion gear 307 (i.e., contacts of the gear 307 with the differential casing 303), which portions are subjected to a force F of FIG. 2 due to the revolution of the differential casing 303 and an alphabet N denotes a center (or mid-point) of the gear 305 in the axial direction.

As shown in FIG. 2, when the vehicle travels forward corresponding to a direction of an arrow 317, the pinion gear 307, to which the force F due to the revolution of the differential casing 303 is applied through a wall of the bore 315, Urges the side gear 311 and the pinion gear 305, so that the pinion gear 307 is subjected to reactive forces f1 and f2 from the gears 311, 305, respectively.

As shown in FIG. 3, since these reactive forces f1, f2 have respective working points of different positions in the axial direction, symmetrical forces 321, 321 as a center N are effected on the pinion gear 307, so that the end points EA, EB are urged to directions 323, 325 of FIG. 4A, respectively, by the moment.

In this way, the pinion gear 307 is inclined to a direction to reduce helix angle $\theta$ of the tooth trace 319 as shown with a dotted line 327, so that a clearance x is produced between the tip of the pinion gear 307 and the wall of the bore 317. Then, the driving torque transmitted to the differential casing 303 is inputted into the pinion gear 307 over the whole length through the wall of the bore 315, while the pinion gear 307 is subjected to high reactive forces at the respective meshing points thereby to abut on the wall of the bore 315.

We now calculate the clearance x with reference to FIG. 4B.

In this example, providing that the face width but chamfers of the pinion gear 307 is represented by L mm, the helix angle $\theta$ and the tip diameter R, the circumferential length between the end point EA and the end point EB is obtained by:

$$L \times \tan\theta$$

Therefore, the circumferential length between each of the end points EA, EB and the mid-point N will be a half of the length $L \times \tan\theta$, respectively.

Furthermore, providing that an angle formed by a line segment between the center N and a center 0 (an axis of the pinion gear 307) and another line segment between the respective end points EA, EB and the center 0 is represented by $\alpha$, an expression of $\alpha$ is obtained as follows:

$$\alpha = [(L \times \tan\theta)/2]/(R \times \pi) \times 360 \quad (1)$$

Next, providing that displacements of the respective end points EA, EB in along directions 323, 325 caused by the inclination pinion gear 307 are represented by $\delta$ while the clearance defined between the pinion gear 307 and the bore 315 is represented by "x", an expression of x is obtained as follows:

$$x = \sin\alpha \times \delta \text{mm} \quad (2)$$

The value of x (mm) corresponds to each clearance at the end Q points EA, EB of the tooth traces 310. The closer the respective end points EA, EB approach the center N, the smaller the value $\alpha$ in the above expression (1) and the value x in the above expression (2) become respectively. Finally, the clearance x will be zero at the center N. Thus, it means that when the vehicle travels forward and the tip of the pinion gear 30? in the vicinity of the mid-point N comes into (frictional) contact with the wall of the bore 315, the wearing will be further progressed. That is, since a contact margin of the pinion gear 107, which margin is engageable with the wall of the bore 315 when the driving torque is transmitted to the differential casing 303, is shortened by the reduction in helix angle caused due to the above mentioned inclination, the only portion in the vicinity of the mid-point N of the pinion gear 307 comes into contact with the wall of the bore 315, so that it cannot be realized that the pinion gear 307 comes into uniform contact with the bore 315 over the whole tooth widths. Consequently, the larger the inputted torque gets, the more the abrasion progresses Conversely, when the vehicle travels backward, forces opposite to the reactive forces f1, f2 of FIGS. 2 and 3 are exerted on the pinion gear 307. In this case, the gear 307 is then inclined to the opposite direction by forces 329, 329 of FIG. 3, so that the helix angle θ is increased. Under such a condition, the clearance x reaches the maximum in the vicinity of the mid-point N while exhibiting zero at the respective end points EA, EB. Thus, the pinion gear 307 is subjected to advanced abrasion about the point EA, EB where the gear 307 abuts on the bore 315 intensively.

FIG. 6 shows a short pinion gear 333 where a tooth trace 331 is formed to the opposite direction of that of the above-mentioned pinion gear 307. Note, the pinion gear 333 is also arranged so as to rotate following the preceding long pinion gear with respect to the rotating direction 300 of the differential casing 303, as similar to the pinion gear 307. When the vehicle travels forward, the pinion gear 333 is subjected to forces 335, 335 originating in reactive forces f1, f2, so that the tooth trace 331 inclines thereby to increase the helix angle θ, as shown with a dotted line 337. On the contrary, when the vehicle travels backward, the pinion gear 333 is inclined by the opposite forces 339, 339, so that the helix angle θ of the tooth trace 331 decreases. Accordingly, when the vehicle is traveling forward, the clearance x reaches the maximum in the vicinity of the midpoint N as shown in FIG. 7, so that it cannot be realized that the pinion gear 333 comes into uniform contact with the bore 315 over the whole tooth widths, which is similar to the "backward-traveling" condition of FIGS. 2 and 3. Thus, when traveling forward, the pinion gear 337 will be subjected to advanced abrasion about the point EA, EB where the gear 307 abuts on the bore 315 intensively, while the pinion gear 337 will be subjected to advanced abrasion about the mid-point N when traveling backward.

As mentioned above, which portion of the helical gear is worn depends on the direction of the tooth trace and the traveling direction of vehicle.

In FIGS. 8, 9 and 10, an arrow indicated by reference numeral 351 designates a rotating direction of the differential casing 303 when the vehicle travels forward. Under such a forward traveling condition, each of the long pinion gear 305 is arranged so as to rotate preceding to the short pinion gear 307 in the rotating direction 351 of the differential casing 303.

When the differential casing 303 rotates in the direction 351 as shown in FIG. 8, rotational torque shown with arrows of dotted lines 353, 355 is exerted on a first gear portion 341 of the pinion gear 305 and a first gear portion 347 of the pinion gear 307 from the bores 313, 315, respectively, while load torque as reactive force shown with arrows of full lines 357, 359 is exerted on the differential casing 303 through the bores 313, 315, respectively.

Then, as shown in FIGS. 9 and 10, meshing reactive forces F1, F2 by the mutual meshing of the gears are produced in opposite directions at second gear portions 349, 343 of the pinion gears 307, 305, respectively. On the other side, at the respective first gear portions 341, 347, meshing reactive forces F3, F4 in the same direction are produced by respective meshing operations of the pinion gears 305, 307 with the side gears 309, 311, as shown in FIG. 10.

From FIG. 10, it will be found that tipping torque applied on the long pinion gear 305 is larger than that applied on the short pinion gear 307 since the directions of the forces F2, F4 applied on the pinion gear 305 are opposite to each other while the directions of the forces F1, F3 applied on the pinion gear 307 are substantially identical to each other. In this way, each of the long pinion gears 305 is inclined to the rotational axis by the tipping torque, so that respective axial ends thereof move from a position at the time of unloaded condition to another position at the time of loaded condition, as shown with full lines and double-dotted lines of FIG. 8, respectively.

Due to the inclination of the pinion gear 305, each gear 305 is brought into contact with the bore 303 at respective points as shown with arrows 361, 363, 365 of FIG. 11, so that the surface pressure becomes to be excessive at these portions. Consequently, the pinion gear 305 and the bore 303 are worn partially thereby to lower the durability of the differential apparatus 301.

On the contrary, when the vehicle is in the backward traveling condition under which the differential casing 303 rotates in the opposite direction, such a point-contact is caused in the short pinion gears 307, so that the durability of the differential apparatus 301 is lowered, too.

SUMMARY OF THE INVENTION

It is therefore an object of the present invention to provide a differential apparatus which is adapted so as to support respective tips of pinion gears by bores formed in a differential casing and which is capable of preventing the partial wearing caused by the inclined pinion gears thereby to improve the durability of the apparatus.

According to the present invention, the object described above can be accomplished by a differential apparatus for a vehicle, comprising:

a differential casing rotated by a driving force of an engine of the vehicle;

a pair of side gears arranged in the differential casing, opposing to each other and rotatably 'supported in coaxial with an axis of the differential casing;

at least one pair of pinion gears arranged radially outward the side gears, the pinion gears having respective first gear portions meshing with the side gears, respectively, and second gear portions meshing with each other;

at least one pair of bores formed about the side gears in the differential casing to accommodate the pinion gears so as to rotate frictionally therein; and maintaining means for maintaining a contact area of either one of the pinion gears with the bore when the pinion gear is slanted to an axis of the bore by reactive forces exerted on the first and second gear portions from the bore.

In the present invention, preferably, on condition that helix angle of a tooth trace of the pinion gear is decreased by the reactive forces while the vehicle's forward driving, the maintaining means comprises gear teeth formed on the pinion gear respective tooth depths of the gear teeth being gradually decreased from respective axial end portions of the pinion gear toward the axial intermediate portion.

If the pinion gear is slanted with respect to the axis of the bore so that the helix angle of each tooth trace is decreased, the pinion gear will be brought into excessive contact with the bore at an axial intermediate portion of the gear. Therefore, according to the above-mentioned preferred embodiment, since either one of the pinion gears is so formed that tooth depths of the gear teeth are gradually decreased from the respective axial end portions toward the axial intermediate potion, the pinion gear comes into uniform contact with the bore over the whole tooth width Consequently, it is possible to prevent the occurrence of partial-wear, in other words, the eccentric abrasion and seizure over the whole tooth widths of the pinion gear.

In the above embodiment, more preferably, the pinion gears are arranged so that when the vehicle is traveling forward, the pinion gear having the gear teeth revolves around the sides gears while following the other of the pinion gears with respect to the rotating direction of the differential casing.

In such a case, it is possible to prevent the occurrence of partial-wear and seizure effectively at the vehicle's forward traveling under which a larger torque is applied on the pinion gears in comparison with that in the vehicle's backward traveling.

Alternatively, it is preferable, on condition that helix angle of a tooth trace of the pinion gear is increased by the reactive forces while the vehicle's forward driving, the maintaining means comprises gear teeth formed on the pinion gear, tooth depths of the gear teeth are gradually increased from respective axial end portions of the pinion gear toward the axial intermediate portion.

Conversely, if the pinion gear is slanted to the axis of the bore so that the helix angle of tooth trace is increased, the pinion gear will be brought into excessive contact with the bore in the vicinity of respective axial end portions of the pinion gear. Therefore, according to the above-mentioned preferred embodiment, since the pinion gear is so formed that tooth depths of the gear teeth are gradually increased from the respective axial end portions toward the axial intermediate potion, the pinion gear comes into uniform contact with the bore over the full tooth-width of the gear teeth. Consequently, it is possible to prevent the occurrence of partial-wear and seizure over the whole tooth widths of the pinion gear, too.

In the above invention, more preferably, the pinion gears are arranged so that when the vehicle is traveling forward, the pinion gear revolves the side gears while following the other of the pinion gears with respect to the rotating direction of the differential casing.

In such a case, it is possible to prevent the occurrence of partial-wear and seizure effectively at the vehicle's forward traveling under which a larger torque is applied on the pinion gears in comparison with that in the vehicle's backward traveling.

Alternatively, it is preferable that the maintaining means comprises a chamfered portion formed on the pinion gear, the pinion gear being slanted to its rotational axis by meshing reactive forces exerted on the first gear portion and-the-second gear portion.

Also in this case, since the contact area of the slanted pinion gear with the bore can be maintained by the chamfered portion, the partial-wear of the pinion gear due to the point-contact and the increase in surface pressure can be avoided thereby to improve the durability of the differential apparatus remarkably.

In the above invention, more preferably, the pinion gears are arranged so that when the vehicle is traveling forward, the pinion gear having the chamfered portion revolves around the side gears while being followed by the other of the pinion gears with respect to the rotating direction of the differential casing.

In this case, since the chamfered portion is formed on the pinion gear which is subjected to a large tipping torque when the vehicle is traveling forward, the durability of the differential apparatus can be further improve. In addition, since such a chamfered portion is not formed on the other pinion gear which is not slanted when the vehicle is traveling forward, it can be expected to reduce the manufacturing cost.

Preferably, the chamfered portion is provided with gear teeth of which tooth depths are gradually decreased toward respective axial end portions of the pinion gear, providing a tapered or spherical chamfered portion Also in this case, it is possible to exclude the reduction in durability of the differential apparatus, which is caused by the inclination of the pinion gear. For example, since it is easy to process the tapered chamfered portion, the manufacturing cost can be saved that so much. Further, although the helix angle of the pinion gear changes in either case that the differential casing has a somewhat little rigidity or case that the side gears are shifted in the radial direction slightly by meshing, it is possible to cope with such a change in helix angle by adjusting the radius R (curvature) of the chamfered portion, so that the point contact with the bore can be prevented effectively in response to the changes in helix angle thereby to improve the durability of the differential apparatus.

More preferably, the chamfered portion comprises a tapered or spherical part positioned on the side of the axial end portions to have gear teeth of which tooth depths are gradually decreased toward respective axial ends of the pinion gear, and a cylindrical part arranged axially inward the tapered or spherical part to have gear teeth of the same tooth depths.

In this case, by providing the tapered or spherical part on the side of the axial end portions of the pinion gear, it is possible to exclude the point contact between the pinion gear and the bore, which will be caused when the vehicle's traveling forward.

Further, when the vehicle is traveling backward or coasting on the road, no inclination is caused in each pinion gear since a direction of torque applied thereon is opposite to that in traveling forward. In even the case, since the pinion gear comes into contact with the bore through the cylindrical part, the point contact between the pinion gear and the bore can be prevented. In this way, it is possible to prevent the pinion gear from partial-wearing due to the point contacts in both cases of traveling forward and backward, so that the durability of the differential apparatus can be improved remarkably.

Note, in the above modification, a ratio of the tapered or spherical part to the cylindrical part may be optionally determined corresponding to a ratio of torque transmitted in the forward traveling to the torque in the backward traveling.

Preferably, the pinion gear further includes conical chamfered portions formed on respective axial ends of the pinion gear.

In this case, even if the pinion gears is slanted to the rotational axis, the contact area of the pinion gear with end faces of the bore can be maintained by the conical chamfered portions to reduce the pressure caused between the axial ends of the pinion gear and the end faces of the bore. Consequently, the eccentric abrasion can be prevented to improve the durability of the differential apparatus.

In addition, by providing the chamfered portions on the axial ends of the pinion gear, the sliding operation of the pinion gear on the end faces of the bore can be stabilized. Therefore, in case of helical gears as the pinion gears, it is possible to stabilize the torque-responsive type differential-limiting function of the differential apparatus, originating in meshing thrust between the helical gears.

Preferably, one of said pair of pinion gears includes an axle portion connecting said first gear portion with said second gear portion.

In operation, the long pinion gear has a long distance between working points of meshing reactive forces, so that the gear is subjected to a large tipping torque. On condition that a clearance between the long pinion gear and the bore is equal to that between the short pinion gear and the bore, the short pinion gear has a large helix angle because of its shortness in length, in comparison with the helix angle of the long pinion gear. Therefore, the long pinion gear is apt to exhibit a larger surface pressure at the point-contact area. However, according to the present invention, it is possible to prevent the partial-wear of the pinion gear and the bore, which is derived from the inclination of the pinion gear, in all cases, whereby the durability can be improved remarkably.

These and other objects and features of the present invention will become more fully apparent from the following description and appended claims taken in conjunction with the accompanying drawings.

DESCRIPTION OF THE PREFERRED EMBODIMENT

A first embodiment in accordance with the present invention is now described with reference to FIGS. 12, 13 and 14.

Figure 12:
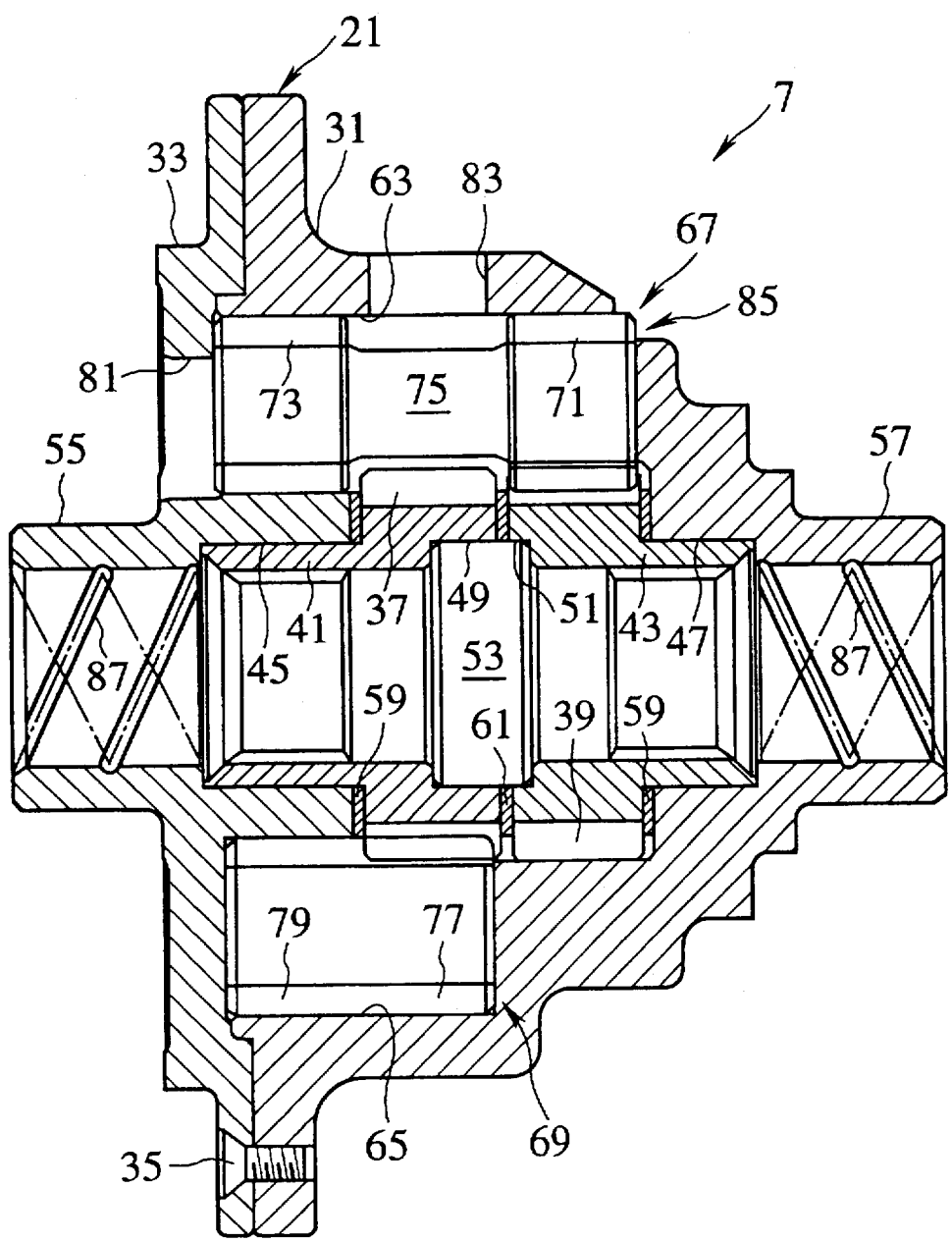
FIG. 12 is a longitudinal sectional view of a differential apparatus in accordance with a first embodiment of the present invention.

FIG. 12 is a cross sectional view of a differential apparatus in accordance with the first embodiment of the present invention. FIG. 13 shows a gear assembly of the apparatus, which consists of a pair of helical pinion gears and a pair of helical side gears. It is noted that, in FIG. 13, left and right directions shown in the figure correspond to left and right directions of FIG. 12, respectively.

As shown in FIG. 12, a differential casing 21 of the differential apparatus 7 rotated by driving force of an not-shown engine is composed of a casing body 31 and a cover 33 connected to the body 31 by a bolt 35. A pair of left and right helical side gears 37, 39 are accommodated in the differential casing 21. The helical side gears 37, 39 includes hollow boss parts 41, 43 which are rotatably supported by bearing parts 45, 47 of the differential casing 21 and enlarged diametrical parts 49, 51 formed inside the boss parts 41, 43, respectively.

Arranged radially inward of the enlarged diametrical parts 49, 51 is a thrust block 53 which serves to bear respective free ends of the helical side gears 37, 39 thereby to center the free ends on the helical side gears 37, 39.

Not-shown left and right rear axles, which penetrate through the boss parts 55, 57 of the differential casing 21, are spline-coupled to the boss parts 41, 43 of the helical side gears 37, 39 respectively, and associated with each other through the thrust block 53. Thrust washers 59, 59 are arranged between the respective helical side gears 37, 39 and the differential casing 21, while a thrust washer 61 is interposed between the helical side gears 37 and 39.

Along outer peripheries of the helical side gears 37, 39, the casing body 31 has plural pairs of long and short bores 63, 65 formed so as to extend in parallel with a rotational axis of the drive shafts. In the casing body 31, long helical pinion gears 67 are accommodated to frictionally rotate in the long bores 63, while short helical-pinion gears 69 are accommodated so as to frictionally rotate in the short bores 65, respectively.

Each of the long helical pinion gear 67 consists of a first gear portion 71, a second gear portion 73 and an axle portion 75 for connecting the gear portions 71, 73 to each other. On the other hand, each of the short helical pinion gear 69 consists of a first gear portion 77 and a second gear portion 79 directly connected thereto. In arrangement, the first gear portion 77 of the short helical pinion gear 69 is arranged so as to mesh with the left helical side gear 37 while the second gear portion 79 is arranged so as to mesh with the second gear portion 73 of the long helical pinion gear 67.

Figure 1:
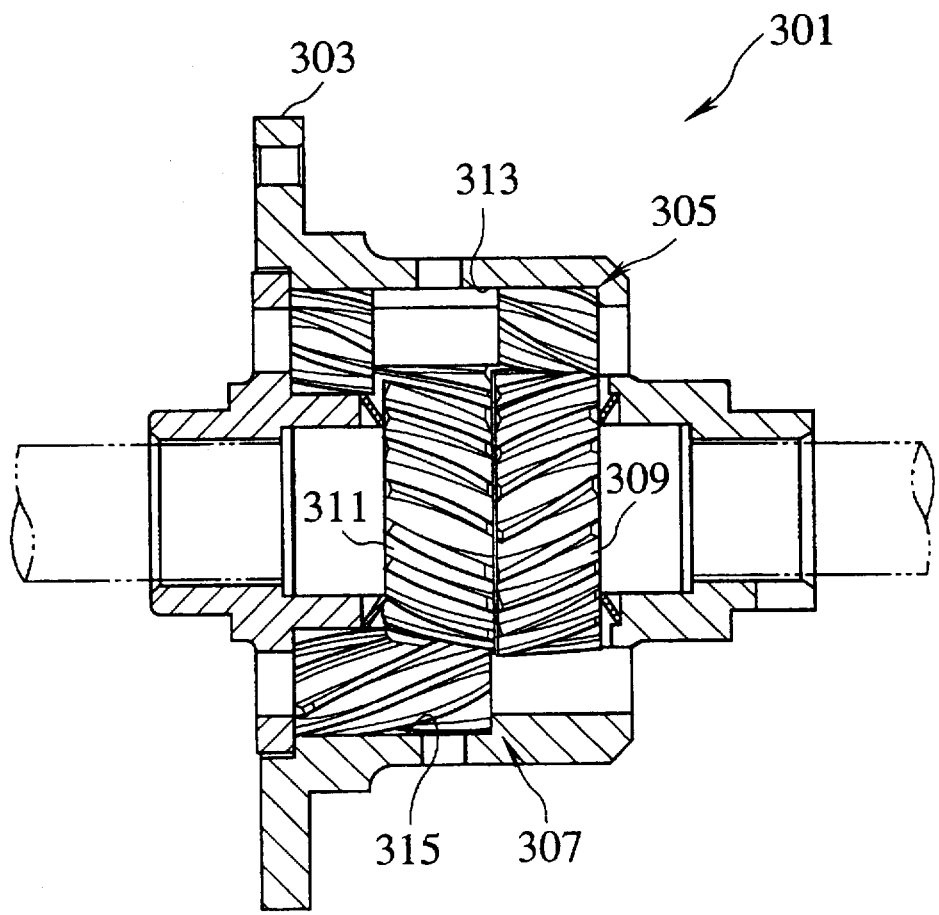
FIG. 1 is a longitudinal sectional view of the prior art differential apparatus.

As shown in FIG. 1, the differential casing 21 is provided with openings 81, 83, 85. The differential casing 21 further has spiral-shaped oil grooves 87, 87 formed on the inner peripheries of the boss parts 55, 57. In a rotating operation of the differential apparatus 7, oil splattered from a not-shown oil reservoir flows in and out of the differential casing 21 through the openings 81, 83, 85 and the oil grooves 87, 87 to lubricate respective meshing parts of the helical gears and respective frictional areas in the differential apparatus 7.

In operation, a driving force to rotate the differential casing 21 is transmitted from the engine and distributed into the left and right drive shafts through the helical pinion gears 67, 69 and the helical side gears 37, 39.

For example, due to the vehicle's driving on a bad road, if there is caused a difference in driving resistance between the left drive shaft and the left drive shaft, the driving force of the engine will be distributed into the left and right drive shafts differentially by rotations of the helical pinion gears 67, 69.

While torque is transmitted, respective tips of the helical pinion gears 67, 69 are forced against circumferential inner walls of the bores 63, 65 by meshing reactive forces from the helical side gears 37, 39, so that frictional resistance is produced between the gears 67, 69 and the bores 63, 65. In addition, due to meshing thrust force between these helical gears, frictional resistance is produced between respective end faces of the helical pinion gears 67, 69 and the differential casing 21, between the helical side gears 37, 39 and the differential casing 21 through the thrust washers 59, 59 and furthermore, between the helical side gear 37 and the helical side gear 39 through the trust washer 61. In this way, a "torque-responsive" type of differential limiting function of the differential apparatus 7 can be realized by each frictional resistance.

Figure 2:
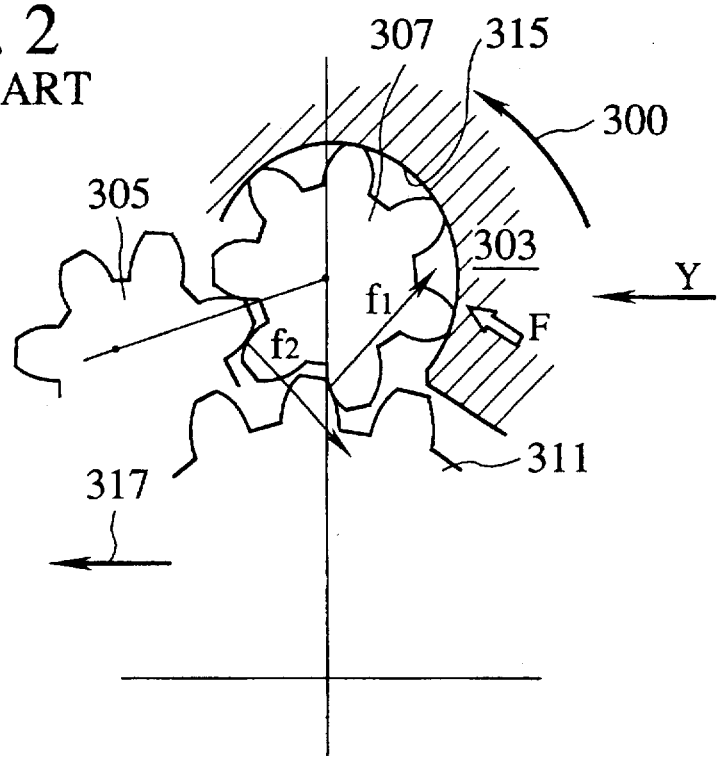
FIG. 2 is a cross sectional view of a part of the differential apparatus of FIG. 1.
Figure 3:
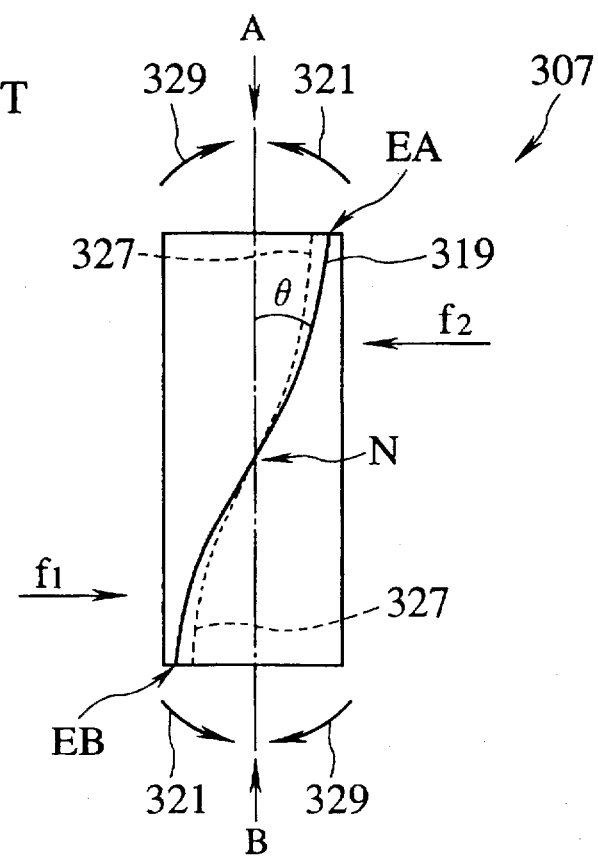
FIG. 3 is a side view of a helical pinion gear for explanation of inclination of the gear.
Figure 4A:
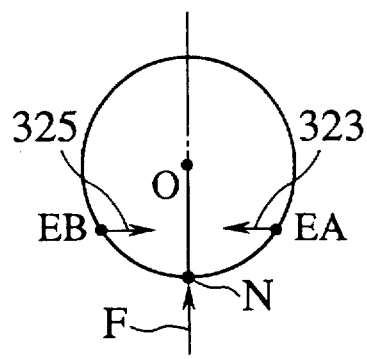
FIG. 4A is an axial end view of a helical pinion gear for explanation of inclination of the gear.
Figure 4B:
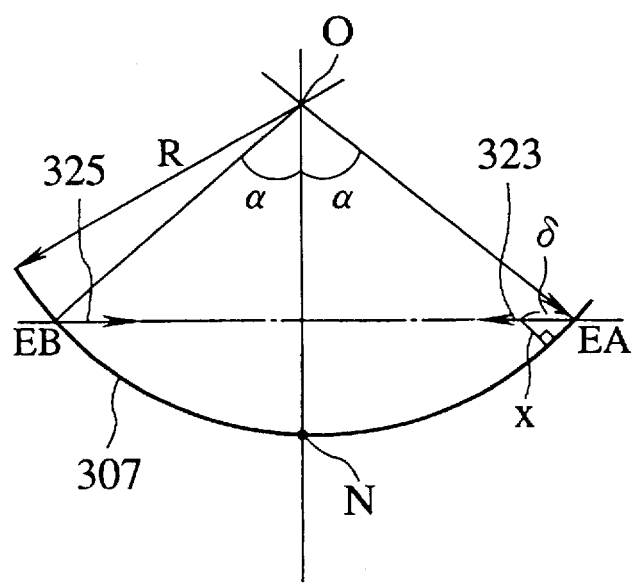
FIG. 4B is an enlarged view of FIG. 4A.
Figure 5:
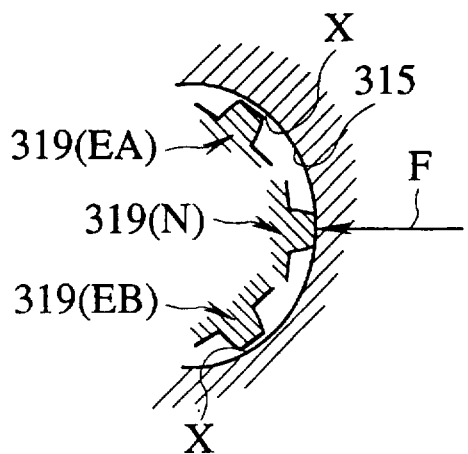
FIG. 5 is a partial cross sectional view showing a clearance between the pinion gear and a bore for accommodating the gear therein.
Figure 13:
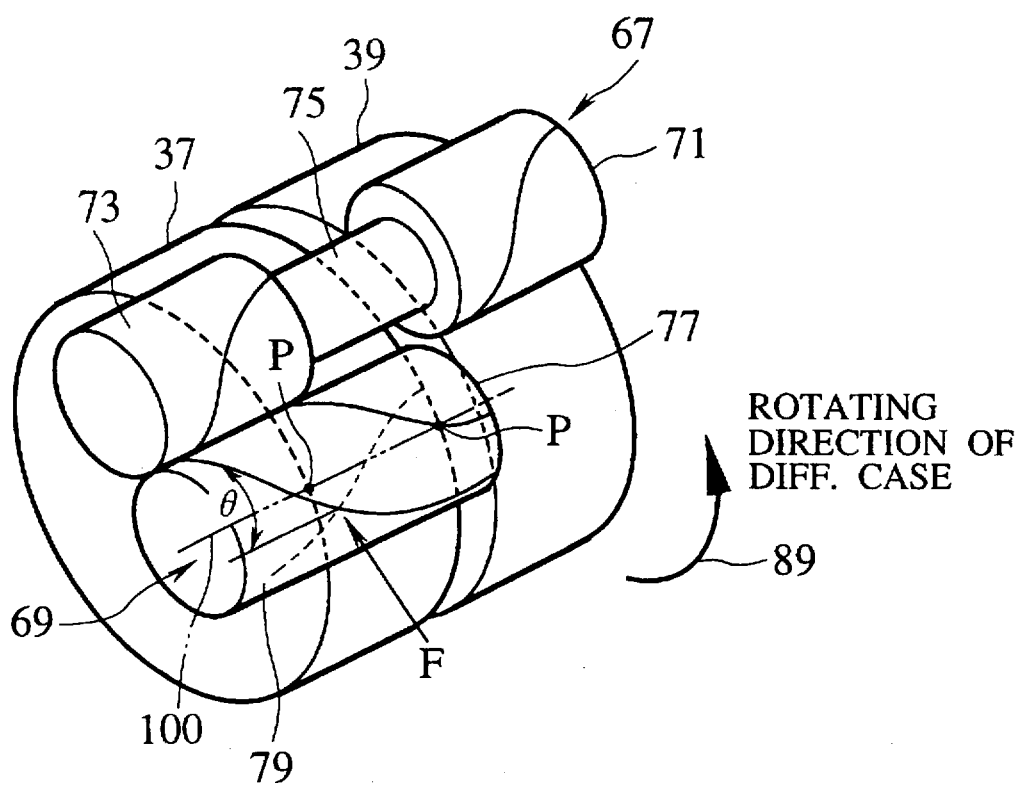
FIG. 13 is a perspective view of a gear assembly constituting the differential apparatus of FIG. 12.

Respective tooth traces of the gear portions 71, 73, 77, 79 of the helical pinion gears 67, 69 are formed in directions shown in FIG. 13. In the figure, an arrow 89 designates a rotating direction of the differential casing 21 when a not-shown vehicle carrying the differential apparatus 7 is traveling forward (advance) Then, the short helical pinion gear 69, which revolves around the helical side gear 37 while following the long helical pinion gear 67 with respect to the rotating direction 89 of the differential casing 21, is urged to the second gear portion 73 of the helical pinion gear 67 and the left helical side gear 37 by a force F ( identical to the force F of FIG. 2) from the wall of the bore 65.

This corresponds to the condition of FIGS. 2 to 5 where the helical pinion gear 69 is inclined to a direction to reduce a helix angle θ of the tooth trace while the vehicle is traveling forward, so that an axial intermediate portion of the gear 69 comes into contact with the bore 65 intensively.

Figure 14:
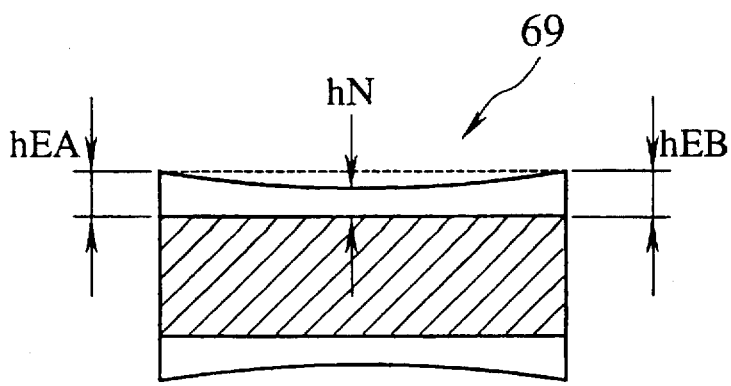
FIG. 14 is a longitudinal sectional view of a short pinion gear of the differential apparatus in accordance with the first embodiment.

According to the embodiment, as shown in FIG. 14, the helical pinion gear 69 is formed with gently curved outlines so that a tooth depth hN of the axial intermediate portion is smaller (lower) than tooth depths hEA, hEB of axial end portions of the gear 69.

If the embodiment, a difference between the tooth depth hN and the tooth depths hEA, hEB, which corresponds to a clearance between the helical pinion gear 69 and the bore 63, is established to be 0.03 mm. Although the above difference varies depending on a dimension of the helical pinion gear 69 of the differential apparatus 7 and a dimension of the bore 65 of the differential casing 21, the difference can be easily established to be a desired value by grinding respective tip faces of the helical pinion gear 69. Consequently, while the vehicle is traveling forward where the helical pinion gear 69 is subjected to a force larger than that in case of traveling backward (reverse-driving), the respective tips of the helical pinion gear 69 can be brought into contact with the bore 65 over the full face-width uniformly, whereby the partial-wear (i.e., eccentric abrasion) and seizure problems can be avoided.

In this way, the differential apparatus 7 of the embodiment is constructed.

When the differential apparatus 7 of the embodiment is applied to the vehicle, it is possible to stabilize the motion of a not-shown vehicle body under a large torque at the vehicle's accelerating, decelerating or the like because of its torque-responsive type differential-limiting function, so that an operability for the vehicle can be improved.

As mentioned repeatedly, since each tooth depth of the axial intermediate portion of the short helical pinion gear 69, which portion would come in contact with the bore 85 intensively if traveling forward, is established to be smaller than each tooth depth of the axial end portion of the gear 69, the respective tips of the helical pinion gear 69 can be brought into uniform contact with the bore 65 over the full face-width of teeth. Thus, it is possible to prevent the helical pinion gear 69 from partial-wearing and seizing.

Figure 15:
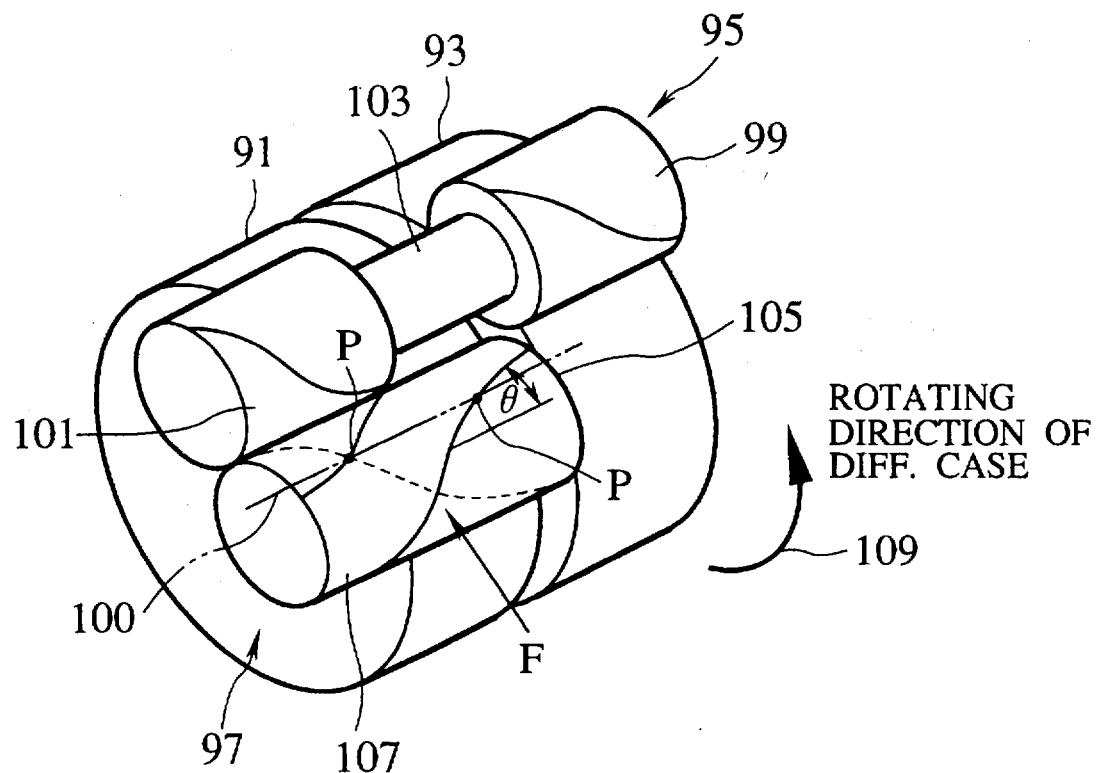
FIG. 15 is a perspective view of a gear assembly of a differential apparatus in accordance with a second embodiment of the present invention.
Figure 16:
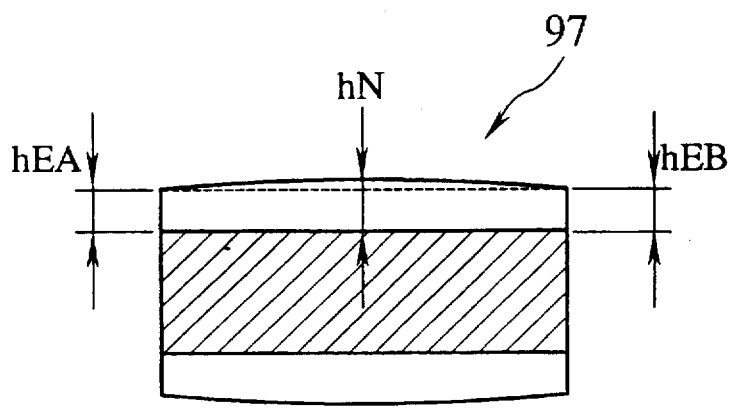
FIG. 16 is a longitudinal sectional view of a short pinion gear of the differential apparatus in accordance with the second embodiment.

We now describe a second embodiment with reference to FIGS. 15 and 16.

FIG. 15 shows a gear section of the differential apparatus in accordance with the second embodiment. Note, in figures described later (including FIGS. 15, 16), elements similar to those elements in the first embodiment are indicated with the same reference numerals and their functional descriptions will be eliminated.

As shown in FIG. 15, a gear assembly of the differential apparatus comprises a pair of left and right helical side gears 91, 93 on the output side and plural pairs of long and short helical pinion gears 95, 97 (one pair is only shown). The helical side gears 91, 93 are supported by the differential casing 21 so as to rotate therein.

Each of the long helical pinion gears 95 consists of a first gear portion 99 in mesh with the helical side gear 93, a second gear portion 101 and an axle portion 103 for connecting the gear portions 99, 101 to each other. On the other hand, each of the short helical pinion gears 97 consists of a first gear portion 105 and a second gear portion 107. In arrangement, the first gear portion 105 is arranged so as to mesh with the left helical side gear 91 while the second gear portion 107 is arranged so as to mesh with the second gear portion 101 of the long helical pinion gear 95.

Respective tooth traces of the gear portions 99, 101, 105, 107 of the helical pinion gears 95, 97 are formed in directions shown in FIG. 15. In the figure, an arrow designates a rotating direction of the differential casing 21 while the vehicle is now traveling forward. Then, the short helical pinion gear 97, which revolves around the side gear 91 while following the long helical pinion gear 95 with respect to the rotating direction 109 of the differential casing 21, is urged to the second gear portion 101 of the helical pinion gear 95 and the left helical side gear 91 by the force F (identical to the force F of FIG. 2) from the wall of the bore 65.

Figure 6:
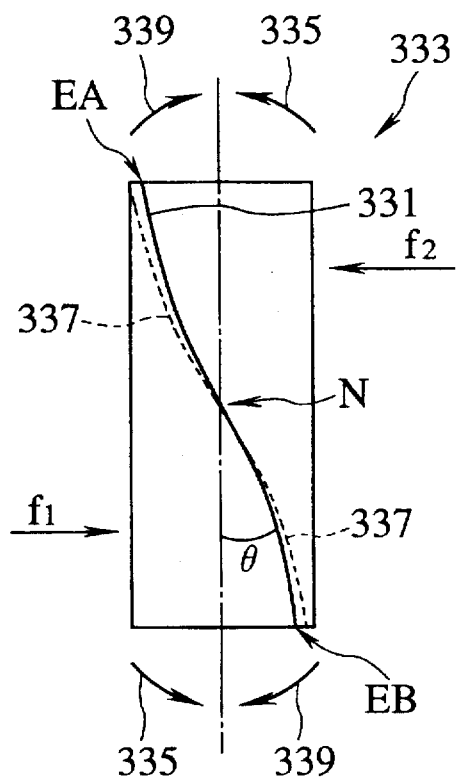
FIG. 6 is a side view of a helical pinion gear inclined to a direction different from that of FIG. 3.
Figure 7:
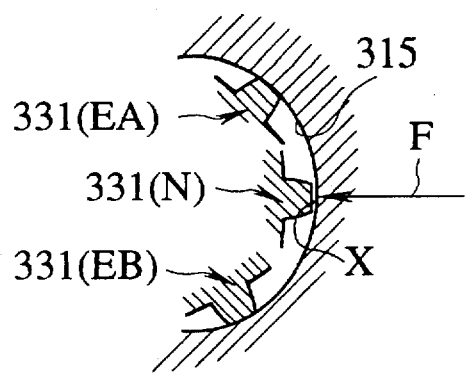
FIG. 7 is a partial cross sectional view showing a clearance between the pinion gear of FIG. 6 and the bore for accommodating the gear therein.
Figure 8:
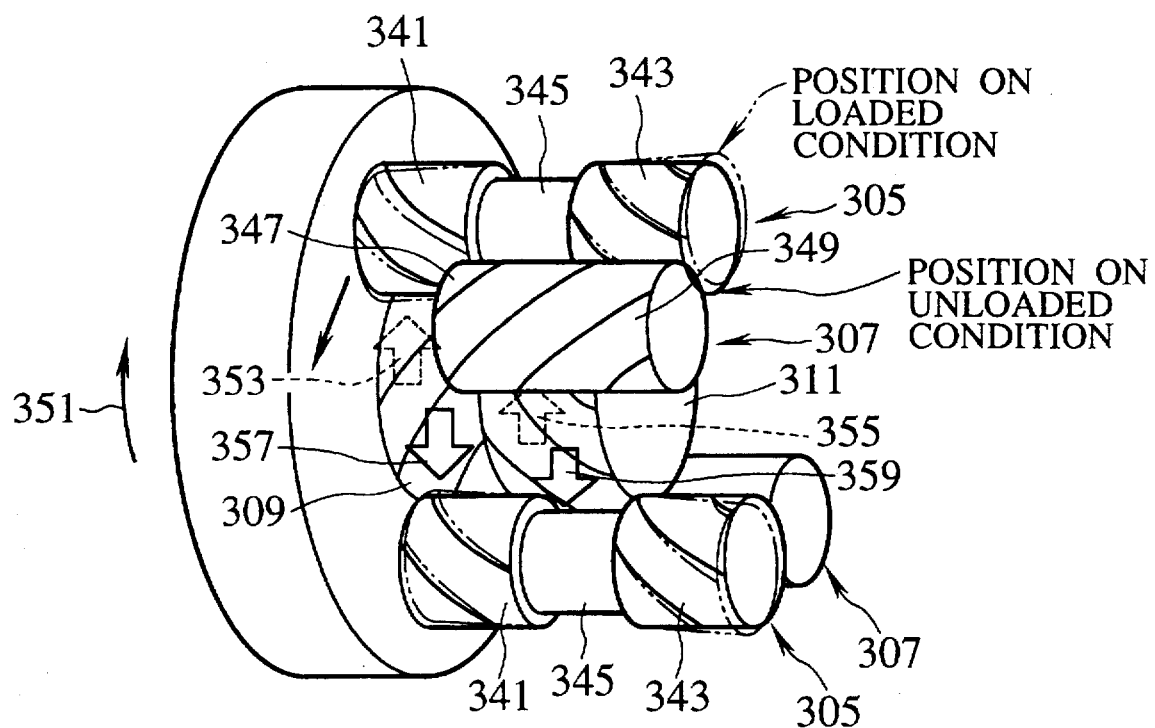
FIG. 8 is a perspective view of a gear assembly of the prior art differential apparatus, showing slanted pinion gears in the assembly.
Figure 9:
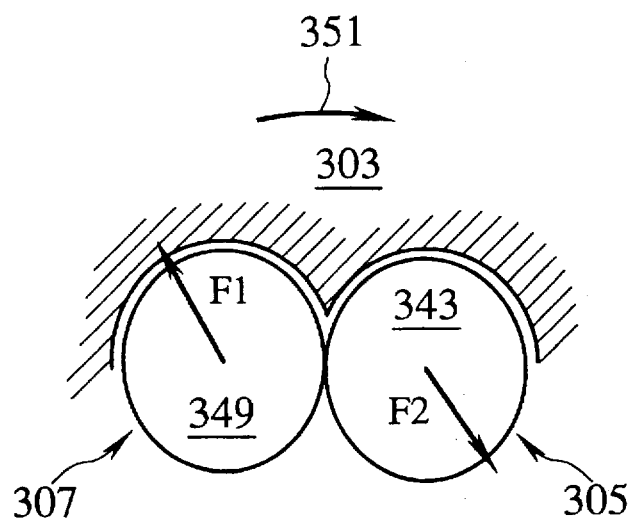
FIG. 9 is a cross sectional View of the meshing pinion gears of FIG. 8, showing respective directions of meshing reactive forces exerted on the pinion gears.
Figure 10:
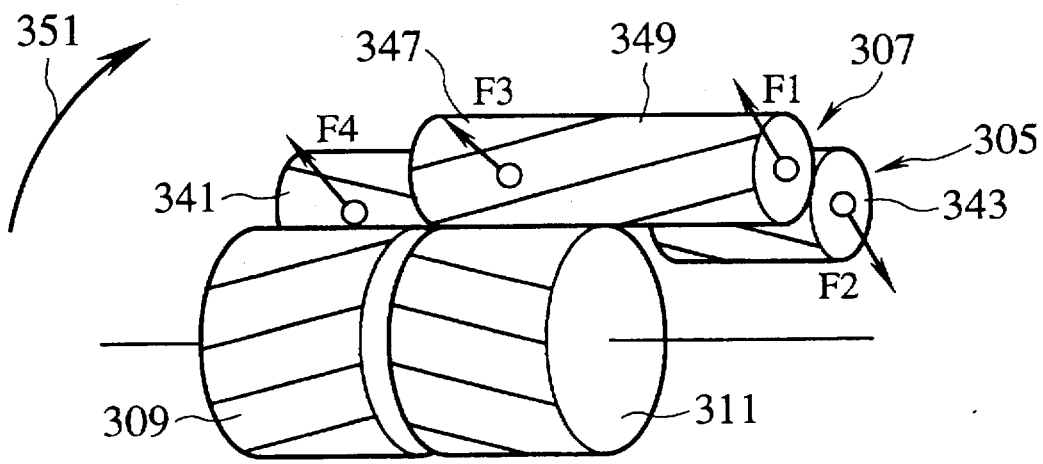
FIG. 10 is a perspective view of the gear assembly of FIG. 8, showing respective directions of meshing reactive forces exerted on the long and short pinion gears.
Figure 11:
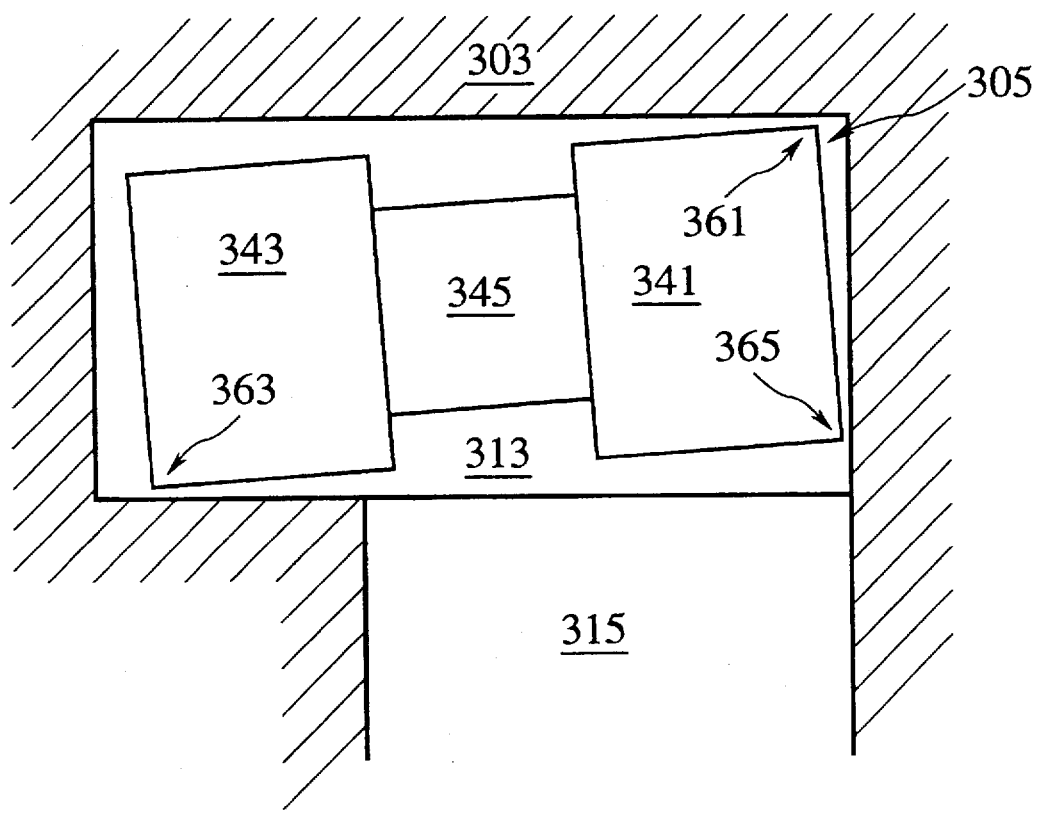
FIG. 11 is a side view of the conventional pinion gear, showing portions of point-contact of the slanted pinion gear with the bore.

This corresponds to the condition of FIGS. 6 and 7 where the helical pinion gear 97 is inclined to a direction to increase the helix angle θ of the tooth trace while the vehicle is traveling forward, so that axial end portions of the gear 97 comes into contact with the bore 65 intensively.

According to the embodiment, as shown in FIG. 16, the helical pinion gear 97 is formed with gently curved Outlines so that the tooth depths hEA, hEB on the axial end portions are respectively smaller than the tooth depth hN at the axial intermediate portion.

The difference between the tooth depth hN and the tooth depths hEA, hEB, which corresponds to a clearance between the helical pinion gear 97 and the bore 65 in the embodiment, is established to be 0.03 mm. Although the difference changes in accordance with a dimension of the helical pinion gear 97 of the differential apparatus 7 and a dimension of the bore 65 of the differential casing 21, the difference can be easily established to be a desired value by grinding respective tip faces of the helical pinion gear 97. Consequently, while the vehicle is traveling forward where the helical pinion gear 97 is Subjected to a force larger than that in case of driving reversely, the respective tips of the helical pinion gear 97 can be brought into contact with the bore 65 over the full face-width uniformly, whereby the eccentric abrasion and seizure problems can be avoided.

In the above-mentioned first and second embodiments, it is noted that if imaginary lines 100 parallel with respective rotational axes of the short helical pinion gears 69, 97 of FIGS. 13 and 15 are drawn so as to face the respective tips, there would be produced a plurality of contacts P of the lines 100 with the respective short bores 65. Of course, the points P are movable in the axial direction by rotation of the helical pinion gears 69, 97.

In operation, when the contacts P move to one side in the axial direction, the inclinations of the helical pinion gears 69, 97 are further progressed by reactive forces exerting on the first and second gear portions 77, 79, so that contact forces of the gears 69, 97 with the bores 65 will be intensified.

However, according to the first and second embodiments, it is possible to bring the respective tips of the helical pinion gears 69, 97 into uniform contact with the bores 65 over the full face-widths of the teeth, irrespective of the above mentioned inclinations of the gears 69, 97 and the number of contacts of the tips with the bore 65, the contacts originating in the relationship between the lengths of the helical pinion gears 69, 97 and the helix angles.

A third embodiment in accordance with the present invention is now described with reference to FIGS. 17 and 18.

Figure 17:
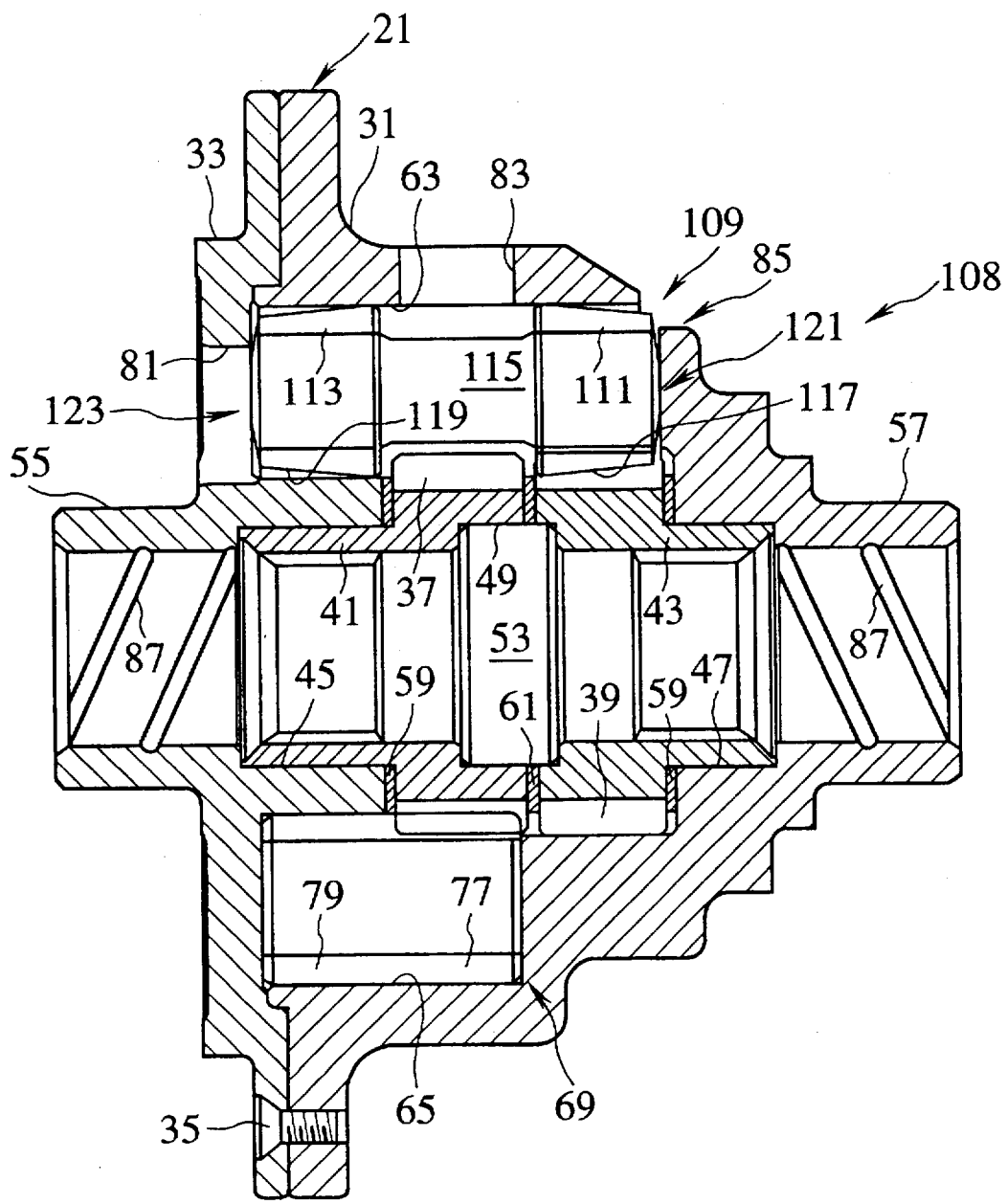
FIG. 17 is a longitudinal sectional view of a differential apparatus in accordance with a third embodiment of the present invention.

FIG. 17 is a cross sectional view of a differential apparatus 108 in accordance with the third embodiment of the present invention. It is noted that, also in FIG. 17, left and right directions shown in the figure correspond to left and right directions of FIG. 12, respectively. In addition, elements similar to those elements in the previously-mentioned embodiments are indicated with the same reference numerals and their functional descriptions are eliminated, too.

Similar to the first embodiment, the plural pairs of long and short bores 63, 65 are formed in the differential casing 21 so as to extend in parallel with rotational axes of the drive shafts: In the casing 21, respective long helical pinion gears 109 are accommodated so as to frictionally rotate in the bores 63, while the short helical pinion gears 69 are respectively accommodated so as to frictionally rotate in the bores 65.

Each long helical pinion gear 109 consists of a first gear portion 111, a second gear portion 113 and an axle portion 115 for connecting the gear portions 111, 113 to each other. On the other hand, each short helical pinion gear 69 consists of the first gear portion 77 and the second gear portion 79. In arrangement, the first gear portion 77 of each short helical pinion gear 69 is arranged so as to mesh with the left helical side gear 37 while the second gear portion 79 is arranged so as to mesh with the second gear portion 113 of the long helical pinion gear 109.

The long helical pinion gears 109 are respectively arranged so as to revolve around the side gears 37, 39 in advance of the short helical pinion gears 69 in the rotating direction of the differential casing 21 while the vehicle travels forward. While the vehicle is driven forward, the first gear portion 111 of each helical pinion gear 109 is subjected to meshing reactive force from the right helical side gear 39, while the second gear portion 113 is subjected to meshing reactive force from the second gear portion 79 of the helical pinion gear 69. Consequently, tipping torque is applied on the helical pinion gear 109 for inclination.

According to the embodiment, the respective gear portions 111, 113 of each helical pinion gear 41 are provided with tapered chamfered portions 117, 119 in which each tooth depth is gradually lowered as it approaches both axial ends of the gear 41. Further, the gear portions 111, 113 are provided on end faces thereof with conical-shaped chamfered portions 121, 123, respectively.

Figure 18:
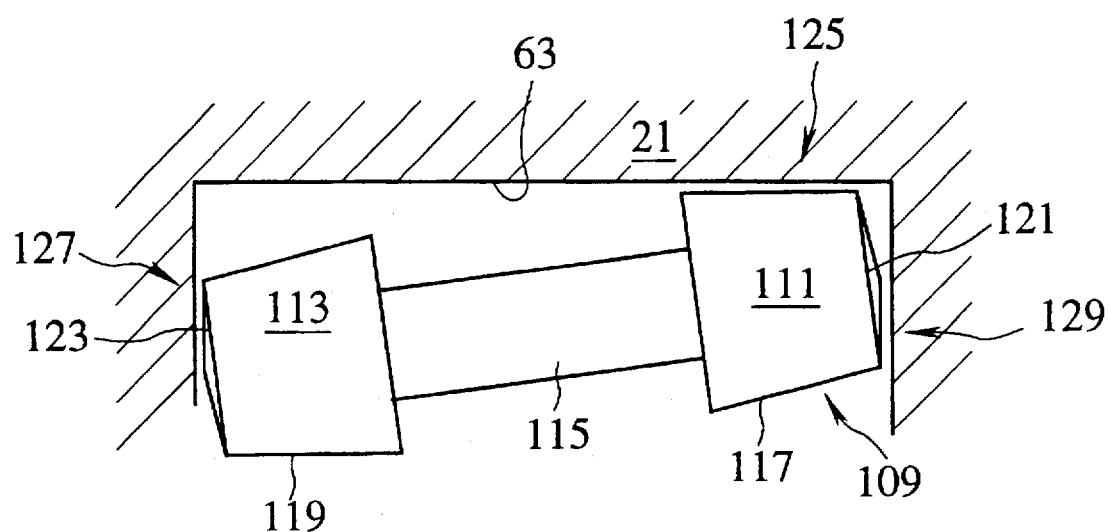
FIG. 18 is a side view of a long pinion gear used in the differential apparatus in accordance with the third embodiment.

FIG. 18 shows the helical pinion gear 109 inclined by the tipping torque caused while traveling forward. Owing to the provision of the respective chamfered portions 117, 119, 121, 123, the contact area of the slanted helical pinion gear 109 with the bore 63 can be increased in comparison with the conventional pinion gear with no chamfered portions.

Thus, in an area indicated with an arrow 125, it is possible to prevent an increasing in surface pressure derived from "point contact" between respective tips of the helical pinion gear 109 and the bore 83. Further, in areas indicated with arrows 127, 129, an increasing in thrust surface pressure derived from the point contact between respective end faces of the helical pinion gear 109 and the bore 63 can be excluded. Consequently, the helical pinion gear 109 can be prevented from being worn in these areas, whereby the durability of the differential apparatus 108 can be remarkably improved.

In addition, since the sliding operation of the helical pinion gear 109 can be stabilized between the end faces of the helical pinion gear 109 and the bore 63 by providing the chamfered portions 121, 123, it is also possible to stabilize the torque-responsive type of differential-limiting function brought by the meshing thrust of the helical gears.

Furthermore, by forming the chamfered portions 117, 119, 121, 123 on the helical pinion gear 109, which will be slanted under the forward traveling condition so that a larger driving torque is exerted thereon, the durability can be particularly progressed. In addition, since such a chamfered portion is not formed on the short helical pinion gears 69 which will not be slanted under the forward traveling condition, a cost to manufacturing the differential apparatus 108 can be reduced, too.

Again, the provision of the chamfered portions 117, 119, 121, 123 is more effective to improve the durability when they are applied on the helical pinion gear 109 of the embodiment, which has a long distance between working points of meshing reactive forces so that the tipping torque is decreased that much larger.

As for the vehicle including the above-mentioned differential apparatus 108, owing to the stable torque responsive type differential-limiting function of the apparatus 108, it is possible to stabilize the motion of the vehicle body under a large torque at the vehicle's accelerating, decelerating or the like.

Further, due to the increased durability of the differential apparatus 108, it is possible to realize its excellent operability and stability over a long period of time.

Figure 19:
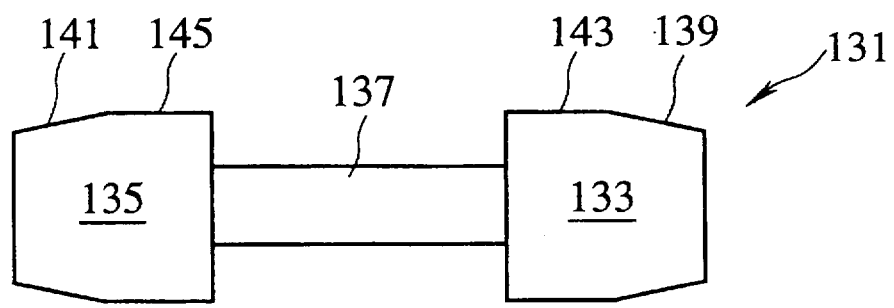
FIG. 19 is a side view of a long pinion gear used in a differential apparatus in accordance with a fourth embodiment of the present invention.

A fourth embodiment will be described with reference to FIG. 19. FIG. 19 shows a long helical pinion gear 131 adopted in the differential apparatus of this embodiment.

Each of the helical pinion gear 131 is accommodated in the bore 83 of the differential casing 21 so as to frictionally rotate therein. The long helical pinion gear 131 consists of a first gear portion 133, a second gear portion 135 and an axle portion 137 for connecting the gear portions 133, 135 to each other. In arrangement, the first gear portion 133 is arranged so as to mesh with the helical side gear 39 while the second gear portion 135 is arranged so as to mesh with the second gear portion 79 of the short helical pinion gear 69.

The long helical pinion gears 131 are respectively arranged so as to revolve around the side gears 37, 39 in advance of the short helical pinion gears 89 in the rotating direction of the differential casing 21 in case that the vehicle is traveling forward. While the vehicle is traveling forward, the long helical pinion gears 131 are inclined by meshing reactive forces applied on the respective gear portions 133, 139.

As shown in FIG. 19, the first and second gear portions 133, 135 of each helical pinion gear 131 are provided with tapered chamfered portions 139, 141 which extend from axial centers of the gear portions 139, 141 to respective axial ends thereof. Each of the portions 139, 141 is shaped in a manner that a tooth depth is gradually lowered as it approaches the axial end. The first and second gear portions 133, 135 further includes cylindrical tip portions 143, 145 formed so as to extend from the respective axial centers inwardly.

In this way, by providing the chamfered portions 139, 141 on the side of respective ends of the gear portions 133, 135, the point contact between the helical pinion gears 131 and the bores 63, which will be caused when the vehicle's traveling forward, can be avoided owing to these chamfered portions 139, 141.

On the contrary, when the vehicle is traveling backward or coasting on the road (e.g. a case that the engine brake is activated), no inclination is caused in each helical pinion gear 131 since a direction of torque applied thereon is opposite to that in traveling forward. In even the case, since the helical pinion gear 131 comes into contact with the bore 63 through the cylindrical tip portions 143, 145, the point contact between the gear 131 and the bore 63 can be prevented.

Therefore, in both cases of traveling forward and backward, it is possible to prevent the helical pinion gears 131 from wearing away partially due to the point contacts with the bore 63, so that the durability of the differential apparatus can be improved remarkably.

In addition, since it is easy to process the tapered chamfered portions 139, 141, the manufacturing cost can be saved.

According to the embodiment, no chamfered portion is provided on the short helical pinion gear 69, while the chamfered portions 139, 141 are formed on the long helical pinion gear 131 which is subjected to a large tipping torque when the vehicle is traveling forward and which has a long distance between working points of meshing reactive forces so that the tipping torque is decreased that much larger. Consequently, the durability of the apparatus is not only improved but an increasing of the manufacturing cost can be restricted.

Figure 20:
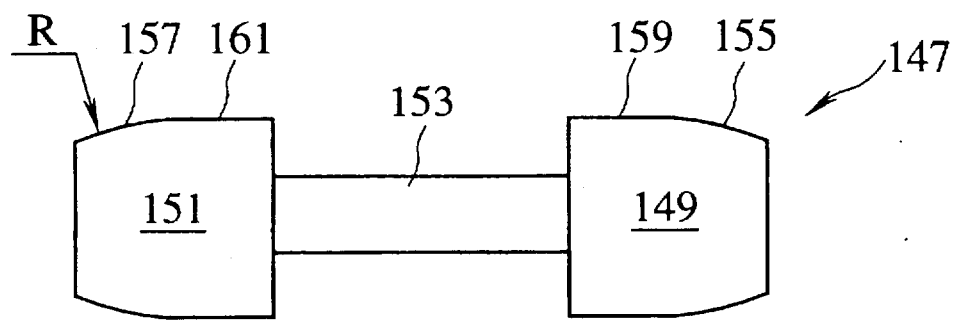
FIG. 20 is a side view of a long pinion gear used in a differential apparatus in accordance with a fifth embodiment of the present invention.

A fifth embodiment will be described with reference to FIG. 20 showing a long helical pinion gear 147 adopted in the differential apparatus.

Similar to the third and fourth embodiments, each of the helical pinion gear 147 is accommodated in the bore of the differential casing 21 so as to frictionally rotate therein, too. The long helical pinion gear 147 consists of a first gear portion 149, a second gear portion 151 and an axle portion 153 for connecting the gear portions 149, 151 to each other. In arrangement, the first gear portion 149 is arranged so as to mesh with the helical side gear 39 while the second gear portion 151 is arranged so as to mesh with the second gear portion 79 of the short helical pinion gear 69.

The long helical pinion gears 147 are respectively arranged so as to revolve in advance of the short helical pinion gears 69 in the rotating direction of the differential casing 21 in case that the vehicle is traveling forward. When the vehicle is traveling forward, the long helical pinion gears 147 are inclined by meshing reactive forces applied on the respective gear portions 149, 151.

As shown in FIG. 20, the first and second gear portions 149, 151 of each helical pinion gear 131 are provided with spherical chamfered portions 155, 157 of radius R, respectively, each of which extends from an axial center of the gear portion 149 (151) to an axial end thereof. Each of the spherical chamfered portions 155, 157 is shaped in a manner that a tooth depth is gradually lowered as it approaches the axial end. The first and second gear portions 149, 151 further includes cylindrical tip portions 159, 161 formed so as to extend from the respective axial centers inwardly.

In this way, by providing the spherical chamfered portions 155, 157 on the side of respective ends of the gear portions 149, 151, it is possible to prevent the point contact between the helical pinion gears 147 and the bores 63, which will be caused when the vehicle's traveling forward.

Further, when the vehicle is traveling backward or coasting on the road so that no inclination is caused in each helical pinion gear 147, the point contact between the gear 147 and the bore 63 can be prevented since the cylindrical tip portions 151, 153 come into contact with the bore Therefore, in both cases of traveling forward and backward, it is possible to prevent the helical pinion gears 147 from wearing partially due to the point contacts with the bores 63, so that the durability of the differential apparatus can be improved remarkably.

It is noted that the helix angle of the helical pinion gear 147 changes in either case that the differential casing 21 has a somewhat little rigidity or that the helical side gears 39, 41 are shifted in the radial direction slightly by meshing. According to the embodiment, however, it is possible to cope with such a change in helix angle by adjusting the radius R (curvature) of the portions 155, 157. Thus, the point contact with the bore 63 can be prevented effectively in response to the changes in helix angle, so that the durability of the differential apparatus can be improved.

Similarly, since the spherical chamfered portions 155, 157 are formed on the long helical pinion gear 147 which is subjected to a large tipping torque, while no chamfered portion is not provided on the short helical pinion gear 69, the durability of the apparatus is not only improved but an increasing of the manufacturing cost can be restricted.

Figure 21:
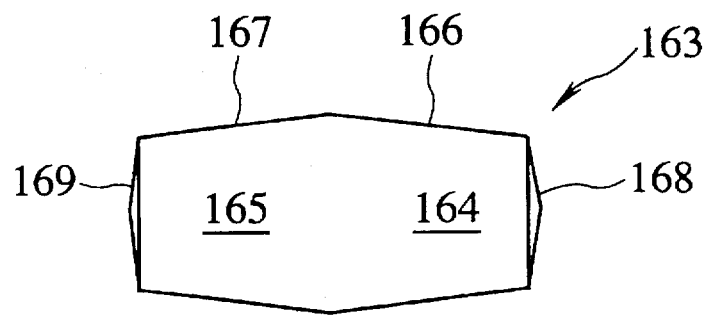
FIG. 21 is a side view of a short pinion gear used in the differential apparatus in accordance with a sixth embodiment of the present invention.

A sixth embodiment will be described with reference to FIG. 21, showing a short helical pinion gear 163 of the differential apparatus, representatively. The helical pinion gear 163 is accommodated in the bore 65 (FIG. 17) of the differential casing 21 so as to frictionally rotate therein, too. The long helical pinion gear 163 consists of a first gear portion 164 and a second gear portion 165. In arrangement, the first gear portion 164 is arranged so as to mesh with the helical side gear 37 while the second gear portion 165 is arranged so as to mesh with the second gear portion 113 of the long helical pinion gear 121.

The short helical pinion gears 163 are respectively arranged so as to rotate in advance of the long helical pinion gears 109 in the rotating direction of the differential casing 21 in case that the vehicle is traveling forward. When the vehicle is traveling forward, the helical pinion gears 163 are inclined by meshing reactive force exerted on the gear portions 164, 165.

As shown in FIG. 21, according to the embodiment, the respective gear portions 164, 165 of the helical pinion gear 163 are provided with tapered chamfered portions 166, 167 in which each tooth depth is gradually lowered as it approaches both axial ends of the gear 163. Further, the gear portions 164, 165 are provided on end faces thereof with conical-shaped chamfered portions 168, 169, respectively.

In this way, owing to the provision of the respective chamfered portions 166, 167, 168, 169, the contact area of the slanted helical pinion gear 163 with the bore 69 can be increased to prevent an increasing of surface pressure by the point-contact and the resulting partial wearing, whereby the durability of the differential apparatus 108 can be remarkably improved.

In addition, since the sliding operation of the helical pinion gear 163 can be stabilized between the end faces of the helical pinion gear 163 and the bore 65 by providing the chamfered portions 168, 169, it is also possible to stabilize the torque-responsive type differential-limiting function of the apparatus 108, originating in meshing thrust between the helical gears.

Furthermore, since it is easy to process the tapered chamfered portions 166, 167, 168, 169, the manufacturing cost can be saved.

According to the embodiment, no chamfered portion is provided on the long helical pinion gear 109 while the chamfered portions 166, 167, 168, 169 are formed on the short helical pinion gear 163 which is subjected to a large tipping torque when the vehicle is traveling forward and which has a large helix angle because of its short length. Consequently, the durability of the differential apparatus 108 is not only improved but an increasing of the manufacturing cost can be restricted.

Figure 22:
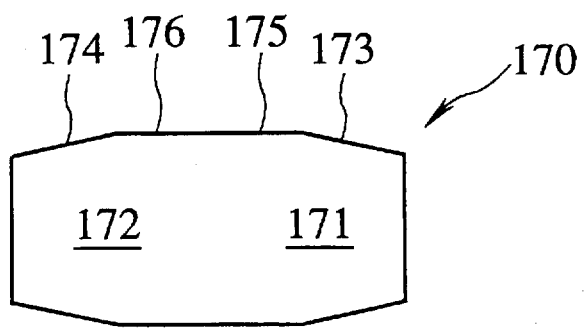
FIG. 22 is a side view of a short pinion gear used in a differential apparatus in accordance with a seventh embodiment or the present invention.

A seventh embodiment will be described with reference to FIG. 22, showing a short helical pinion gear 170 of the differential apparatus, representatively.

This helical pinion gear 170 is accommodated in the bore 65 of the differential casing 21 so as to frictionally rotate therein. The helical pinion gear 170 is constituted by a first gear portion 171 adapted so as to mesh with the helical side gear 37 and a second gear portion 172 adapted so as to mesh with the second gear portion 113 of the long helical pinion gear 109.

Providing that the vehicle is traveling forward, the short helical pinion gears 170 are respectively arranged so as to rotate in advance of the long helical pinion gears 109 in the rotating direction of the differential casing 21. At the vehicle's forward traveling, the helical pinion gears 170 are inclined by meshing reactive forces exerted on the respective gear portions 171, 172.

As shown in FIG. 22, the first and second gear portions 171, 172 of each helical pinion gear 170 are provided with tapered chamfered portions 173, 174 which extend from respective axial centers of the portions 171, 172 to respective axial ends thereof. Each of the portions 173, 174 is shaped in a manner that a tooth depth is gradually lowered as it approaches the axial end. The first and second gear portions 171, 172 further includes cylindrical tip portions 175, 176 formed so as to extend from the respective axial centers inwardly.

In this way, by providing the chamfered portions 173, 174 on the side of respective ends of the gear portions 171, 172, the point contact between the helical pinion gears 170 and the bores 65, which will be caused when the vehicle's traveling forward, can be avoided.

On the contrary, when the vehicle is traveling backward or coasting on the road, no inclination is caused in each helical pinion gear 170 since a direction of torque applied thereon is opposite to that in traveling forward. In even the case, since the helical pinion gear 170 comes into contact with the bore 65 through the cylindrical tip portions 175, 176, the point contact between the gear 170 and the bore 65 can be prevented.

Therefore, in both cases of traveling forward and backward, it is possible to prevent the helical pinion gears 170 from wearing away partially due to the point contacts with the bore 65, so that the durability of the differential apparatus can be improved remarkably.

In addition, since it is easy to process the tapered chamfered portions 173, 174, the manufacturing cost can be saved.

According to the embodiment, no chamfered portion is provided on the long helical pinion gear 109 while the chamfered portions 173, 174 are formed on the short helical pinion gear 170 which is subjected to a large tipping torque while the vehicle is traveling forward and which has a large helix angle because of its short length. Consequently, the durability of the differential apparatus 108 is not only improved but an increasing of the manufacturing cost can-be restricted.

Figure 23:
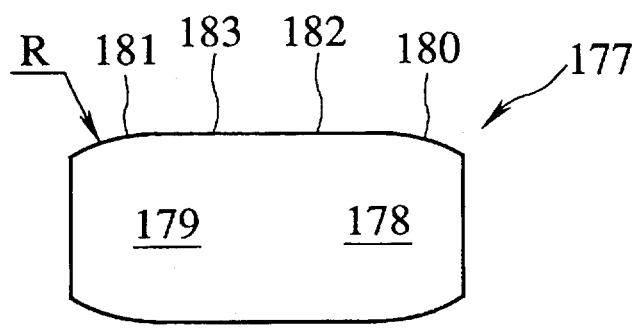
FIG. 23 is a side view of a short pinion gear used in a differential apparatus in accordance with a ninth embodiment of the present invention.

An eighth embodiment will be described with reference to FIG. 23 showing a long helical pinion gear 177 adopted in the differential apparatus.

Also in the eight embodiment, each helical pinion gear 177 is accommodated in the bore 65 of the differential casing 21 so as to frictionally rotate therein. The long helical pinion gear 177 is constituted by a first gear portion 178 adapted so as to mesh with the helical side gear 37 and a second gear portion 179 adapted so as to mesh with the second gear portion 113 of the long helical pinion gear 109.

Providing that the vehicle is traveling forward, the lone helical pinion gears 177 are respectively arranged so as to rotate in advance of the short helical pinion gears 89 in the rotating direction of the differential casing 21. When the vehicle is traveling forward, the short helical pinion gears 177 are inclined by meshing reactive forces applied on the respective gear portions 178, 179.

As shown in FIG. 23, according to the eighth embodiment, the first and second gear portions 178, 179 of each helical pinion gear 177 are provided with spherical chamfered portions 180, 181 of radius R, respectively, each of which extends from an axial center of the gear portion 178 (179) to an axial end thereof. Each of the spherical chamfered portions 180, 181 is shaped in a manner that a tooth depth is gradually lowered as it approaches the axial end. The first and second gear portions 178, 151 further includes cylindrical tip portions 182, 183 formed so as to extend from the respective axial Centers inwardly.

In this way, by providing the spherical chamfered portions 180, 181 on the side of respective ends of the gear portions 178, 179, it is possible to prevent the point contact Between the helical pinion gears 177 and the bores 65, which will be caused when the vehicle's traveling forward.

Further, when the vehicle is traveling backward or coasting on the road so that no inclination is caused in each helical pinion gear 177, the point contact between the gear 177 and the bore 65 can be prevented since the cylindrical tip portions 182, 183 come into contact with the bore 65.

Therefore, in both cases of traveling forward and backward, it is possible to prevent the helical pinion gears 177 from wearing partially due to the point contacts with the bores 65, so that the durability of the differential apparatus can be improved remarkably.

It is noted that the helix angle of the helical pinion gear 177 changes in either case that the differential casing 21 has a somewhat little rigidity or that the helical side gears 39, 41 are shifted in the radial direction slightly by meshing. According to the embodiment, however, it is possible to cope with such a change in helix angle by adjusting the radius R (curvature) of the portions 180, 181. Thus, the point contact with the bores 65 can be prevented effectively in response to the changes in helix angle, so that the durability of the differential apparatus can be improved.

Similarly to the seventh embodiment, since the spherical chamfered portions 180, 181 are formed on the short helical pinion gear 177 which is subjected to a large tipping-torque, while no chamfered portion is provided on the long helical pinion gear 109, the durability of the apparatus is not only improved but an increasing of the manufacturing cost can be restricted.

While all the embodiments mentioned above are directed to the long or short helical pinion gears, obviously other modifications and variations of the present invention are possible, directing to other elements beside the helical pinion gears, as below.

Figure 24:
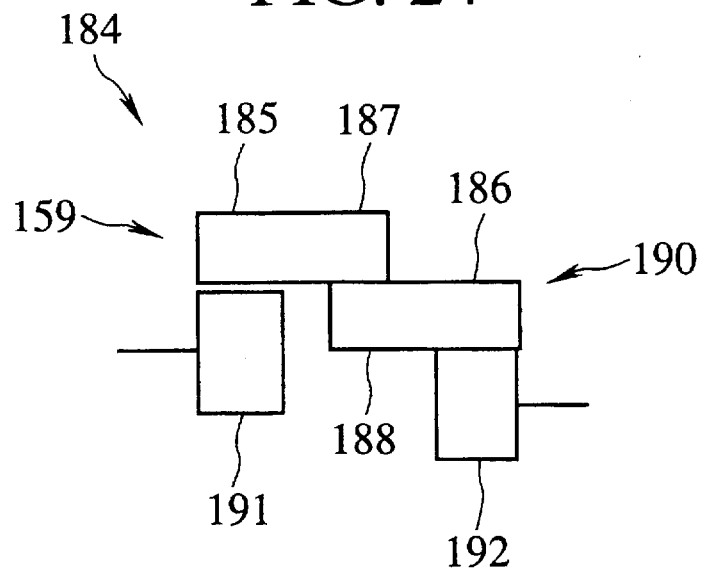
FIG. 24 shows a differential apparatus in a modification the above embodiments of the present invention.
Figure 25:
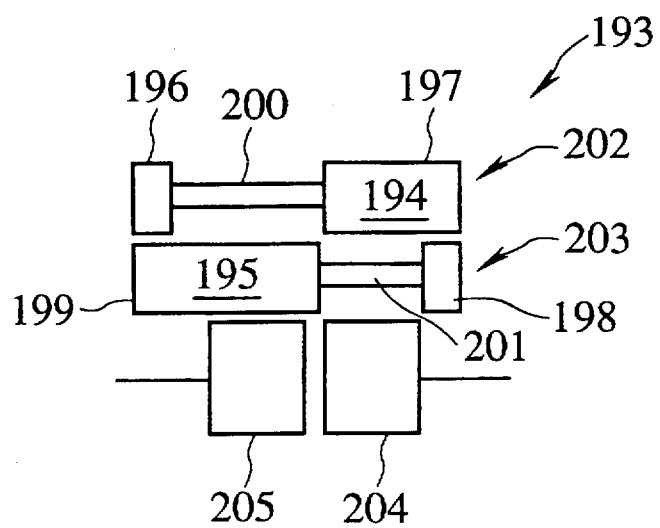
FIG. 25 shows a differential apparatus in another modification of the embodiments of the present invention.

FIGS. 24 and 25 show respective differential apparatuses 184, 193 both of which are different from the above-mentioned differential apparatuses and to which the present invention can be applied.

The differential apparatus 184 of FIG. 24 comprises short helical pinion gears 189, 190 of the same length and a pair of helical side gears 191, 192. The helical pinion gear 189 is composed of a first gear portion 185 and a second gear portion 187 while the helical pinion gear 190 is composed of a first gear portion 186 and a second gear portion 188. In arrangement, the first gear portions 185, 186 are adapted so as to mesh with the helical side gears 191, 192, respectively. The second gear portions 187, 188 are arranged to mesh with each other axially inward of the helical side gears 191, 192.

On the other hand, the differential apparatus 193 of FIG. 25 comprises long helical pinion gears 202, 203 of the same length and a pair of helical side gears 204, 205. The helical pinion gear 202 is composed of a first gear portion 194, a second gear portion 196 and an axle portion 200 of the small diameter, extending between the portions 194, 196. Similarly, the helical pinion gear 203 is composed of a first gear portion 195, a second gear portion 198 and an axle portion 201 of the small diameter, extending between the portions 195, 198. In arrangement, the first gear portions 194, 195 of the helical pinion gears 202, 208 are adapted so as to mesh with the helical side gears 204, 205, respectively, while the second gear portions 196, 197, 198, 199 are arranged to mesh with each other axially outward of the helical side gears 204, 205.

Also in case of the differential apparatuses 184, 198, by providing at least either one of the helical pinion gear 189 and the helical pinion gear 190; the helical pinion gear 202 and the helical pinion gear 208, with a chamfered portion to increase the contact area with the bores, it is possible to improve the durability of the differential apparatuses 184, 193, respectively.

In modifications, the above-mentioned chamfered portion may be formed on both of the helical pinion gears thereby in order to cope with both cases of the vehicle's forward traveling and backward traveling.

Besides the helical gears, the pinion gears and the side gears of the embodiment may be constituted by spur gears.

Furthermore, it should be noted that the differential apparatus of the present invention may be applicable to any one of a front differential apparatus for front wheels, a rear differential apparatus for rear wheels and a center differential apparatus for distributing the driving force into the front and rear wheels.

Finally, it is to be understood that the preferred embodiment disclosed therein is by way of example only and is not intended to impose limitations on the present invention, reference being had for this purpose to the claims which follow.

What is claimed is:

1. A differential apparatus for a vehicle, comprising:
   a differential casing rotated by a driving force of an engine of said vehicle;
   a pair of side gears arranged in said differential casing, opposing to each other and rotatably supported coaxially with an axis of said differential casing;
   at least one pair of pinion gears arranged radially outward of said side gears, said pinion gears having respective first gear portions meshing with said side gears, respectively, and second gear portions meshing with each other;
   at least one pair of bores formed radically outward of said side gears in said differential casing to accommodate said pinion gears so as to rotate frictionally therein; and
   maintaining means for maintaining a contact area of either one of said pinion gears with said bore containing said one of said pinion gears even if said pinion gear is slanted with respect to an axis of said bore by reactive forces exerted on said first and second gear portions from said bore, wherein on condition that helix angle of a tooth trace of said pinion gear is increased by the reactive forces while the vehicle's forward driving, said maintaining means comprises gear teeth formed on said pinion gear, tooth depths of said gear teeth are gradually increased from respective axial end portions of said pinion gear toward the axial intermediate portion.

2. A differential apparatus as claimed in claim 1, wherein said pinion gears are arranged so that when the vehicle is traveling forward, said pinion gear revolves said side gears while following the other of said pinion gears with respect to the rotating direction of said differential casing.

3. A differential apparatus for a vehicle, comprising:
   a differential casing rotated by a driving force of an engine of said vehicle;
   a pair of side gears arranged in said differential casing, opposing to each other and rotatably supported coaxially with an axis of said differential casing;

at least one pair of pinion gears arranged radially outward of said side gears, said pinion gears having respective first gear portions meshing with said side gears, respectively, and second gear portions meshing with each other;

at least one pair of bores formed radially outward of said side gears in said differential casing to accommodate said pinion gears so as to rotate frictionally therein; and maintaining means for maintaining a contact area of either one of said pinion gears with said bore containing said one of said pinion gears even if said pinion gear is inclined with respect to an axis of said bore by reactive forces exerted on said first and second gear portions from said bore, wherein said maintaining means comprises a chamfered portion formed on said pinion gear, said pinion gear being slanted to its rotational axis by meshing reactive forces exerted on said first gear portion and said second gear portion.

4. A differential apparatus as claimed in claim 3, wherein said pinion gears are arranged so that when the vehicle is traveling forward, said pinion gear having said chamfered portion revolves around said side gears while being followed by the other of said pinion gears with respect to the rotating direction of said differential casing.

5. A differential apparatus as claimed in claim 4, wherein said chamfered portion is provided with gear teeth of which tooth depths are gradually decreased toward respective axial end portions of said pinion gear, providing a tapered or spherical chamfered portion.

6. A differential apparatus as claimed in claim 5, wherein said chamfered portion comprises a tapered or spherical part positioned on the side of said axial end portions to have gear teeth of which tooth depths are gradually decreased toward respective axial ends of said pinion gear, and a cylindrical part arranged axially inward said tapered or spherical part to have gear teeth of the same tooth depths.

7. A differential apparatus as claimed in claim 3, wherein the one of said pinion gears further includes conical chamfered portions formed on said respective ends, whereby even if said pinion gear is slanted to the rotational axis, the contact area of said pinion gear with end faces of said bore can be maintained by said conical chamfered portions.

8. A differential apparatus as claimed in claim 3, wherein one of said pair of pinion gears includes an axle portion connecting said first gear portion with said second gear portion.

9. A differential apparatus, comprising:

a first side gear rotatable about an axis;

a second side gear rotatable about the axis, in opposition to the first side gear;

a casing member covering the first and second side gears, the casing member being rotatable about the axis;

a first bore formed in the casing member, the first bore extending in parallel to the axis;

a second bore formed in the casing member, the second bore extending in parallel to the axis;

a first pinion frictionally slidingly rotatably fitted in the first bore, the first pinion having a first gear portion thereof meshing with the first side gear; and a second pinion frictionally slidingly rotatably fitted in the second bore, the second pinion having a first gear portion thereof meshing with the second side gear and a second gear portion thereof meshing with a second gear portion of the first pinion, the second pinion comprising an axisymmetric member with tooth grooves formed therein, the axisymmetric member having a contact portion to be brought into surface contact with a wall of the second bore, the contact portion having a diameter thereof axially continuously varied.

10. A differential apparatus according to claim 9, wherein the contact portion comprises an axially mediate portion of the axisymmetric member.

11. A differential apparatus according to claim 10, wherein the diameter gradually decreases, as it approaches an axially central part of the axisymmetric member.

12. A differential apparatus according to claim 10, wherein the diameter gradually increases, as it approaches an axially central part of the axisymmetric member.

13. A differential apparatus according to claim 9, wherein the contact portion comprises the first gear portion.

14. A differential apparatus according to claim 9, wherein the contact portion comprises the second gear portion.

15. A differential apparatus according to claim 13, wherein the diameter straightly decreases as it approaches an axial end part of the axisymmetric member.

16. A differential apparatus according to claim 13, wherein the diameter progressively decreases, as it approaches an axial end part of the axisymmetric member.

17. A differential apparatus according to claim 13, wherein the diameter gradually decreases as it approaches an axial end part of the axisymmetric member.

18. A differential apparatus according to claim 13, wherein the diameter gradually increases, as it approaches the axial end part of the axisymmetric member.

19. A differential apparatus according to claim 9, wherein the contact portion comprises an axial end portion axisymmetric member.

20. A differential apparatus according to claim 19, wherein the diameter straightly decreases, as it approaches an axial end part of the axisymmetric member.

21. A differential apparatus according to claim 19, wherein the diameter gradually decreases, as it approaches an axial end part of the axisymmetric member.

22. A differential apparatus according to claim 9, wherein the contact portion comprises an end face part of the axisymmetric member.

23. A differential apparatus according to claim 22, wherein the diameter straightly decreases, as it approaches an axial end point of the axisymmetric member.

24. A differential apparatus according to claim 22, wherein the diameter gradually decreases, as it approaches an axial end point of the axisymmetric member.

25. A differential apparatus according to claim 11 wherein the tooth grooves define righthanded helical teeth.

26. A differential apparatus according to claim 12, wherein the tooth grooves define lefthanded helical teeth.

27. A differential apparatus according to claim 9, wherein the second pinion has an axle portion with a reduced diameter for interconnecting the first and second gear portions thereof.

28. A differential apparatus according to claim 14, wherein the diameters straightly decreases, as it approaches an axial end part of the axisymmetric member.

29. A differential apparatus according to claim 14, wherein the diameter progressively decreases, as it approaches an axial end part of the axisymmetric member.

30. A differential apparatus according to claim 14, wherein the diameter gradually decreases, as it approaches an axial end part of the axisymmetric member.

31. A differential apparatus according to claim 14, wherein the diameter gradually increases, as it approaches the axial end part of the axisymmetric member.

* * * * *